United States Patent [19]

Eisenacher et al.

[11] Patent Number: 4,730,527

[45] Date of Patent: Mar. 15, 1988

[54] FUEL ELEMENT BUNDLE CUTTER HAVING A WITHDRAWAL MECHANISM FOR CUTTING DUST

[75] Inventors: Heinz Eisenacher, Fuldabrück; Peter Kunze, Karlsruhe; Werner Kirsch, Bruchsal, all of Fed. Rep. of Germany

[73] Assignees: Thyssen Industrie AG, Essen; Deutsche Gesellschaft für Wiederaufarbeitung von Kernbrennstoffen mbH, Hanover, both of Fed. Rep. of Germany

[21] Appl. No.: 887,782

[22] Filed: Jul. 17, 1986

[30] Foreign Application Priority Data

Jul. 17, 1985 [DE] Fed. Rep. of Germany ....... 3525504

[51] Int. Cl.⁴ .................... B23D 15/04; G21C 19/36; B26D 7/18
[52] U.S. Cl. ........................................ 83/100; 83/278; 83/168; 83/925 R
[58] Field of Search ............... 83/100, 98, 278, 925 R, 83/168

[56] References Cited

U.S. PATENT DOCUMENTS

| 3,669,163 | 6/1972 | Crane .................................. 83/98 X |
| 4,214,493 | 7/1980 | Elhaus .................................. 83/100 |
| 4,510,832 | 4/1985 | Guilloteau .................... 83/925 R X |
| 4,528,879 | 7/1985 | Eisenacher .......................... 83/278 |
| 4,566,361 | 1/1986 | DuBost et al. .................... 83/925 R |

*Primary Examiner*—Donald R. Schran
*Attorney, Agent, or Firm*—Becker & Becker, Inc.

[57] ABSTRACT

A fuel element bundle cutter that has horizontal rod bundle feed. A portion of the radioactive dust that is produced when a rod bundle is cut is picked up by scavenging air and is withdrawn with the latter via the chute for the cut-off rod pieces. The bottom of the lower part of the cutter housing, between the housing wall that faces the rod bundle feed and the side walls of the housing, is embodied as a grating, on the bottom side of which is disposed a base plate to which is connected a withdrawal mechanism that includes at least one collecting funnel and withdrawal channel for the remainder of the radioactive dust, which is conveyed by a portion of the scavenging air from the cutter housing. Each withdrawal channel communicates with the chute for the cut-off rod pieces.

6 Claims, 2 Drawing Figures

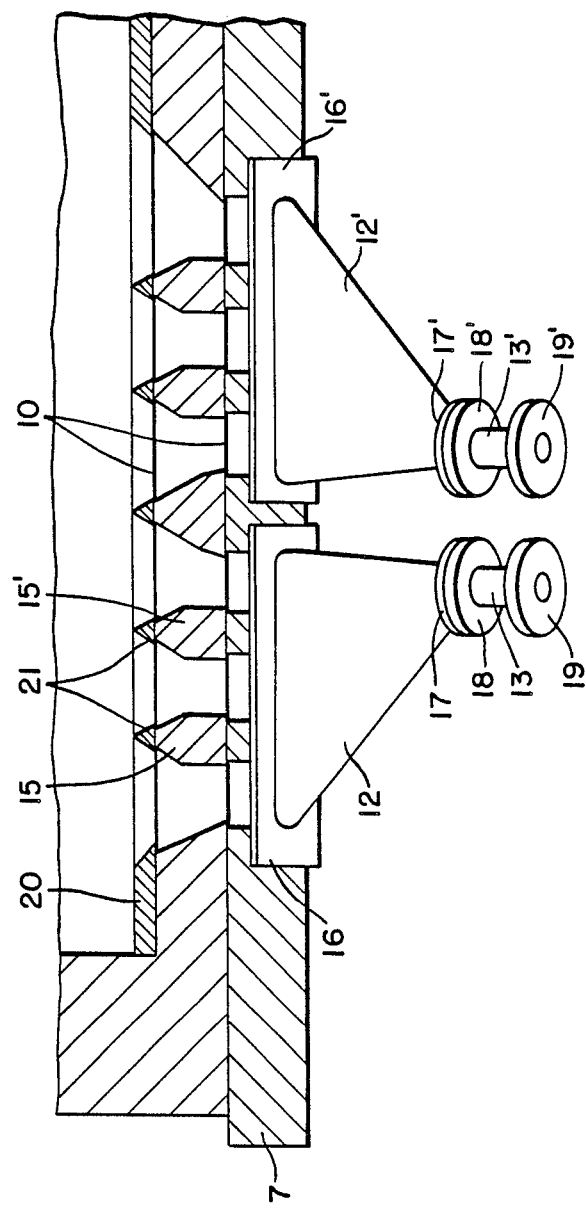

FUEL ELEMENT BUNDLE CUTTER HAVING A WITHDRAWAL MECHANISM FOR CUTTING DUST

BACKGROUND OF THE INVENTION

1. Field of the Invention

The present invention relates to a cutter for cutting bundles of fuel elements, with the cutter having a horizontal tube or rod bundle feed. A portion of the radioactive dust, that is produced when a rod bundle is cut, is picked up by scavenging air and is withdrawn with the latter via the chute for the cut-off rod pieces.

2. Description of the Prior Art

German Offenlegungsschrift No. 26 39 850 Chaze et al of Mar. 17, 1977 discloses a fuel element bundle cutter having a vertical rod bundle feed. With this heretofore known cutter, accumulation of radioactive dust is avoided, and those parts that surround the bundle are cooled. To accomplish this, the magazine in which the rod bundle is disposed is cooled by circulated water and by being rinsed or scavenged with nitrogen, which also picks up the dust particles of the nuclear fuel that are produced when the bundle is cut. Quite apart from the fact that this heretofore known cutter is a so-called vertical bundle cutter, a separate or special withdrawal of cutting dust is not provided.

With a fuel element bundle cutter that has horizontal rod bundle feed, such as is disclosed, for example, in U.S. Pat. No. 4,528,879 Eisenacher dated July 16, 1985, which belongs to the assignee of the present application, the uranium dust that trickles out of the open rods during cutting of the rod bundle is partially picked up by the scavenging air and is conveyed along with the latter through the outlet opening for the cutoff rod pieces in the lower part of the cutter housing into the chute that is connected thereto and that opens into an apparatus for removal of the like. The uranium dust portion that is not picked up by the scavenging air in the lower part of the cutter housing falls through the gap between the housing wall and the cutter carriages, and gradually accumulates on the bottom of the bottom part of the cutter housing. If the ability of the bundle cutter to function is to be maintained, and clogging in the lower part of the cutter housing is to be avoided, this accumulated radioactive dust must be removed after a certain amount of operating time. To remove the accumulated uranium dust from the lower part of the cutter housing, it is first necessary with this type of cutter to dismantle the upper part of the housing and the cutter carriages. Subsequently, while observing safety regulations, the uranium dust is lifted out of the lower part of the housing by means of a spoon-like, remotely controllable manipulator.

It is not advisable to use a liquid to remove the accumulated uranium dust from the fuel element bundle cutter because residual moisture remains in the lower part of the cutter housing and actually enhances accumulation of dust. These types of dust removal are not only very laborious, but are also expensive, because the fuel element bundle cutter cannot be used for a relatively long period of time during the dust removal process.

An object of the present invention therefore is to embody a fuel element bundle cutter of the aforementioned general type that is equipped with withdrawal means for the cutting dust in such a way that the residual radioactive dust is automatically and continuously withdrawn from the cutter housing and is conveyed to the removal mechanism without having to shut the bundle cutter down.

BRIEF DESCRIPTION OF THE DRAWINGS

This object, and other objects and advantages of the present invention, will appear more clearly from the following specification in conjunction with the accompanying schematic drawings, in which:

FIG. 2 is an enlarged cross-sectional view taken along the line II—II in FIG. 1, and shows two withdrawal mechanisms for cutting dust, with only those components that are essential for the present invention being illustrated.

SUMMARY OF THE INVENTION

Figure 1:
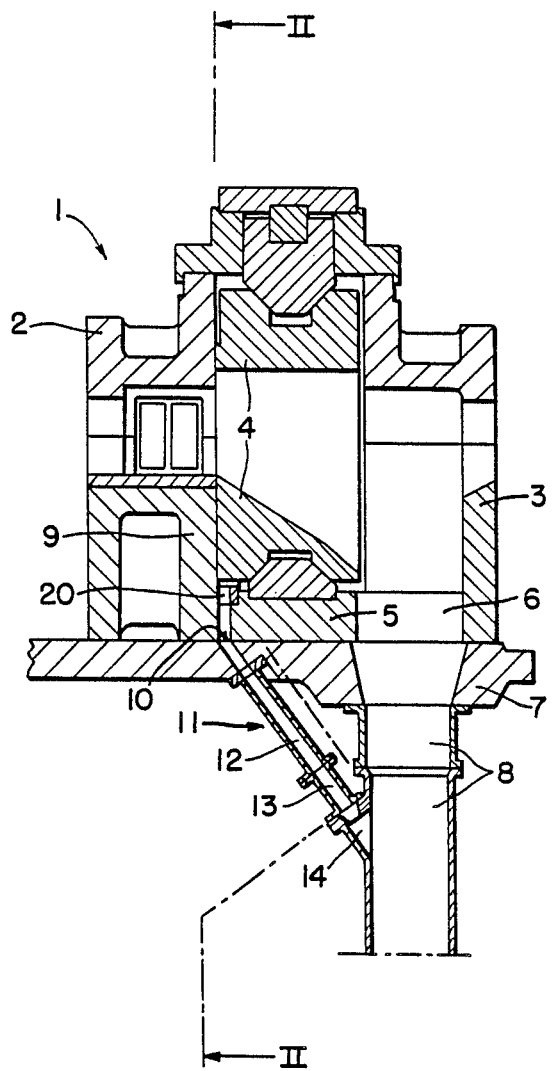
FIG. 1 is a cross-sectional view of a two-part cutter housing of one inventive embodiment of a horizontal fuel element bundle cutter that has a withdrawal mechanism for cutting dust.

The fuel element bundle cutter of the present invention is characterized primarily in that the bottom of the lower part of the cutter housing, between the housing wall that faces the rod bundle feed and the side walls of the housing, is embodied as a grating, on the underside of which is disposed a base plate to which is connected a withdrawal mechanism that includes at least one collecting funnel and one withdrawal channel for the remainder of the radioactive dust, which is conveyed by a portion of the scavenging air from the cutter housing; each of the withdrawal channels communicates with the chute or the cut-off rod pieces.

The particular advantages achieved with the present invention are that the interrupting operations for removing the cutting dust from the cutter housing are eliminated, thus also eliminating the long down times for the bundle cutter caused by such removal operations.

Moreover, it is not necessary to provide additional remotely controlled devices or additional cleaning medium to remove all of the cutting dust.

Further specific features will be described in detail subsequently.

DESCRIPTION OF PREFERRED EMBODIMENTS

Referring now to the drawings in detail, the cutter 1 for cutting bundles of fuel elements, which is partially illustrated in FIG. 1, is provided with a horizontal tube or rod bundle feed, and has a two-part cutter housing that has a respective guide rail in both the upper part 2 of the housing and in the lower part 3 of the housing for a horizontally displaceable cutter carriage 4 that is associated with the cutting mechanism. Disposed after the cutting mechanism, when viewed from the rod bundle feed, in the bottom 5 of the lower part 3 of the cutter housing, is an opening 6 through which the cut-off rod pieces fall from the cutter housing, with the rod pieces then falling through a base plate 7 and into a chute 8 that is connected thereto; the chute 8 opens into a device for removal, etc. of the rod pieces (not illustrated). Also passing through this opening 6 is the housing bottom 5 and into the chute 8 is a portion of the scavenging air, which is introduced into the cutter housing, together with a portion of the radioactive dust from the cutter housing that is produced when the rods of the rod bundles are cut. Between the housing wall 9, which faces the rod bundle feed, and the side walls of the housing, the bottom 5 of the lower part 3 of the cutter hsouing is embodied as a grating grid or grate structure 10. The remainder of the radioactive dust, which trickles into the gap between the cutter carriage 4 and the housing wall 9, is conveyed by a portion of the scavenging air out of the cutter housing, through the grating 10 and the base plate 7 connected thereto, and via a withdrawal mechanism 11 into the chute 8. The openings in the bottom grating 10 are in alignment with the slots in base plate 7. The withdrawal mechanism 11 is connected to the underside of the base plate 7 in an airtight manner, and comprises at least one collecting funnel 12 to which is connected a withdrawal channel 13, which in turn is connected to a connector 14 of the chute 8.

As shown in FIG. 2, those surfaces of the crosspieces 15 of the grating 10, that are directed toward the cutting tools, have a trapezoidal shape.

In the event that two collecting funnels 12 and 12' are provided, as illustrated, the crosspiece 15' disposed between them serves as a separating element for the dust-laden portion of the scavenging air that is to be withdrawn.

An embodiment having two collecting funnels 12 and 12' is more advantageous to the extent that the funnel angle can be steeper, thus assuring a more optimum withdrawal. Each of the collecting funnels 12, 12' is provided with a flange 16, 16' via which the collecting funnel is secured in an airtight manner to the base plate 7. Each collecting funnel 12, 12' is furthermore provided with a second flange 17, 17' at its outlet. This second flange 17, 17' is similarly connected in an airtight manner with a flange 18, 18' of the withdrawal channel 13, 13', which in turn is connected in an airtight manner via a further flange 19, 19' on the connector 14, 14' of the common chute 8.

To further improve the withdrawal of cutting dust, it is possible to dispose a filter member 20 that is embodied as a grating on the bottom 5 of the lower part 3 of the housing. The grating crosspieces 21 of the filler member 20 should expediently have a wedge shape.

The present invention is, of course, in no way restricted to the specific disclosure of the specification and drawings, but also encompasses any modifications within the scope of the appended claims.

What we claim is:

1. A cutter for cutting bundles of fuel elements and including a cutting mechanism with a horizontally displaceable cutter carriage and with said cutter having a horizontal rod bundle feed operatively associated therewith so that cutting dust can pass through means for handling the dust including a gap between the cutter carriage and a housing wall means facing the horizontal rod bundle feed whereby the cutting dust could accumulate in a lower housing location; a portion of the radioactive dust that is produced when a rod bundle is cut is picked up by scavenging air and is withdrawn with the latter via a chute for cut-off rod pieces that fall through an opening into the chute; said cutter further comprises:

cutter means including a cutter housing having the housing wall means with a lower part that includes: a first housing wall that faces said rod bundle feed, housing side walls, and a bottom that is embodied as a grating between said first housing wall and said housing side walls, with said grating having an underside remote from the remainder of said cutter housing;

a base plate connected to said underside of said grating; and a withdrawal mechanism that includes at least one collecting funnel, each of which is connected to said base plate, and a corresponding number of withdrawal channels, each connected to a respective collecting funnel, for the remainder of said radio-active dust, which is conveyed by a portion of said scavenging air from said cutter housing; each of said withdrawal channels communicates with said chute for cut-off rod pieces.

2. A cutter according to claim 1, in which said grating is provided with a plurality of crosspieces, each of which, on a side thereof remote from said base plate, has a trapezoidal shape.

3. A cutter according to claim 2, in which said grating includes a respective crosspiece between each two collecting funnels, with each of said last-mentioned crosspieces serving as a dividing element for said dust-laden scavenging air portion that is to be withdrawn from said lower part of said cutter housing.

4. A cutter according to claim 3, in which each of said collecting funnels is provided with a first flange that is connected in an airtight manner to said base plate.

5. A cutter according to claim 4, in which each of said collecting funnels is provided with an outlet remote from said first flange, with each of said outlets being provided with a second flange; in which each of said withdrawal channels is provided with a third flange that is connected in an airtight manner to a respective one of said second flanges; in which said chute is provided with connectors, the number of which correspond to the number of said withdrawal channels; and with each of said withdrawal channels, remote from said third flange thereof, being provided with a fourth flange that is connected in an airtight manner to a respective one of said connectors of said chute.

6. A cutter according to claim 2, in which said bottom of said lower part of said cutter housing has disposed thereon, remote from said base plate, a grating-like filler member that includes wedge-shaped crosspieces.

* * * * *